(12) United States Patent
Stephens et al.

(10) Patent No.: US 7,047,801 B2
(45) Date of Patent: May 23, 2006

(54) PORTABLE GUIDANCE ASSEMBLY TEST STATION

(75) Inventors: Clark Stephens, Tucson, AZ (US); Jessie Roy Nichols, Tucson, AZ (US); Bryan Richard Nichols, Green Valley, AZ (US); Ryan Joseph Peters, Tucson, AZ (US); Richard Lee Collins, Tucson, AZ (US); David John Drew, Tucson, AZ (US); Jon Rocky Boyd, Tucson, AZ (US); Richard Stephen Dotson, Tucson, AZ (US); Scott David Zibrat, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 52 days.

(21) Appl. No.: 10/837,974

(22) Filed: Apr. 30, 2004

(65) Prior Publication Data

US 2005/0241384 A1   Nov. 3, 2005

(51) Int. Cl.
*G01M 11/00* (2006.01)
*G01M 11/08* (2006.01)
*G01M 3/26* (2006.01)
*G01B 11/26* (2006.01)

(52) U.S. Cl. .............................. 73/167; 73/1.78; 73/40; 250/252.1; 356/72; 356/138

(58) Field of Classification Search .................. 73/167, 73/1.75, 1.78, 40; 250/252.1, 495.1; 356/72, 356/138
See application file for complete search history.

(56) References Cited

U.S. PATENT DOCUMENTS 3,218,849 A * 11/1965 Marvinney et al. ....... 73/167 X
3,266,052 A * 8/1966 Yamron ....................... 73/1.78
3,857,042 A * 12/1974 LaGrange et al. ........ 250/495.1
4,106,345 A * 8/1978 Saunders et al. ......... 73/1.75 X
4,649,274 A * 3/1987 Hartmann ............... 356/138 X
5,247,843 A * 9/1993 Bryan ....................... 73/167 X
5,378,890 A * 1/1995 Wes et al. ................ 250/252.1
5,592,850 A * 1/1997 Rowan ......................... 73/167
5,596,185 A * 1/1997 Bross et al. .............. 250/208.1
6,307,623 B1 * 10/2001 Papuchon et al. ........ 356/152.1

(Continued)

FOREIGN PATENT DOCUMENTS

DE    4303193 A1 * 8/1994

(Continued)

OTHER PUBLICATIONS

PXI™ Systems Alliance website homepage 2003.

(Continued)

*Primary Examiner*—Thomas P. Noland
(74) *Attorney, Agent, or Firm*—Renner, Otto, Boisselle & Sklar, LLP (57) ABSTRACT

A portable system (20) for testing an electro-optical guidance assembly (22) includes an electro-optical test unit (40) with at least two sources of electromagnetic energy at different wavelengths for selectively illuminating the guidance assembly. The electro-optical test unit (40) is mounted within a frame (56) that can be part of a wheeled cart (50). The system (20) further includes one or more of: an adjustable fixture (84) for supporting a guidance assembly (22) for testing, a processor unit (42) for controlling the electro-optical test unit (40), a power supply unit (44) for providing electrical power to the electro-optical test unit (40) and the guidance assembly (22), and a leak test unit (46) for generating a vacuum in the guidance assembly (22) or for pressurizing the guidance assembly (22) with an inert gas to test for leaks.

28 Claims, 10 Drawing Sheets

U.S. PATENT DOCUMENTS 6,542,248 B1 * 4/2003 Schwarz .................. 356/600

FOREIGN PATENT DOCUMENTS

| DE | 19615615 | A1 | * | 10/1997 |
| FR | 2669111 | A | * | 5/1992 |
| FR | 2723190 | A | * | 2/1996 |
| FR | 2802654 | A1 | * | 6/2001 |

OTHER PUBLICATIONS

The PXI Modular Instrumentation Architecture, PXI White Paper, Revised Sep. 12, 2000., p. 1-8.

* cited by examiner

PORTABLE GUIDANCE ASSEMBLY TEST STATION

FIELD OF THE INVENTION

This invention relates to equipment for testing guidance systems, and more particularly to a portable test station for a guidance control system of a missile.

BACKGROUND

Maintenance and repair of electro-optical guidance systems, particularly electro-optical guidance control systems of missiles, for example, typically require transporting the guidance system (and perhaps the entire missile) to a special test facility that has the necessary test stations. These test stations are not meant to be relocated, as they were designed for permanent installation in laboratory and manufacturing settings. The test stations are bulky, difficult and expensive to transport, and require months of set-up time when they are installed in a new location. In addition, the test stations typically only test one type or component of the guidance system, such as either the visible or infrared components, for example. Consequently, maintenance and repair of such guidance systems has been time-consuming and expensive.

SUMMARY

The present invention addresses the aforementioned limitations of guidance control assembly test stations by providing a portable guidance assembly test station that combines the test stations for multiple types of guidance assembly systems into a single electro-optical test unit mounted in a portable frame.

More particularly, the present invention provides a portable system for testing an electro-optical guidance assembly that includes a frame with an electro-optical test unit mounted to the frame for testing the operation of one or more electro-optical systems in a guidance assembly. The frame can be mounted on wheels to form a cart. Within the cart, the components are mounted on anti-vibration mounts to isolate those components from vibration that could damage those components during transport. The electro-optical test unit includes at least two sources that output electromagnetic energy at different wavelengths for selectively illuminating a guidance assembly with electromagnetic energy from at least one of the sources at a time.

In an exemplary embodiment, the system also includes an adjustable fixture mountable on the frame for supporting a guidance assembly for testing. The fixture also has associated therewith an alignment system for accurately positioning the fixture and thus the guidance assembly. The system provided by the preset invention can further include a processor unit, a power supply unit and a leak test unit in addition to the electro-optical test unit.

The processor unit can control the electro-optical test unit and typically can analyze or facilitate the analysis of the test results. An exemplary processor unit includes a processor and one or more of: (i) an electronic data storage device, (ii) software for operating the test unit, storing and analyzing results, identifying repairs to be made, or providing work instructions to an operator for test or repairs, (iii) one or more input devices, including one or more of a port for receiving electronic data, a modem, a keyboard, an electronic pointer, a touch screen, and a microphone, and (iv) one or more output devices, including one or more of a display, a speaker, a modem, and a port for transmitting electronic data. The processor unit can operate to select a desired source, select a desired target, and align the selected source and the target so that the selected source illuminates the selected target for presentation to a guidance assembly as part of the test.

The power supply unit provides electrical power to the electro-optical test unit and the processor unit, as well as the leak test unit, and can include a universal power conversion unit for converting electrical power from any available source of electricity into a standard form of electrical power that will power the various electronic components.

The portable system can further include a container adapted to receive one or more carts to further protect the carts and the test units mounted therein during transportation and storage.

An exemplary leak test unit includes a pump for generating a vacuum to purge the guidance assembly or for pressurizing the guidance assembly with an inert gas to test for leaks. The leak test unit includes a flowmeter for monitoring fluid flow to detect leaks.

The foregoing and other features of the invention are fully described and particularly pointed out in the claims, the following description and the annexed drawings, which together set forth in detail a certain illustrative embodiment of the invention. This embodiment indicates, however, but one of the various ways in which the principles of the invention may be employed.

DESCRIPTION

Figure 1A:
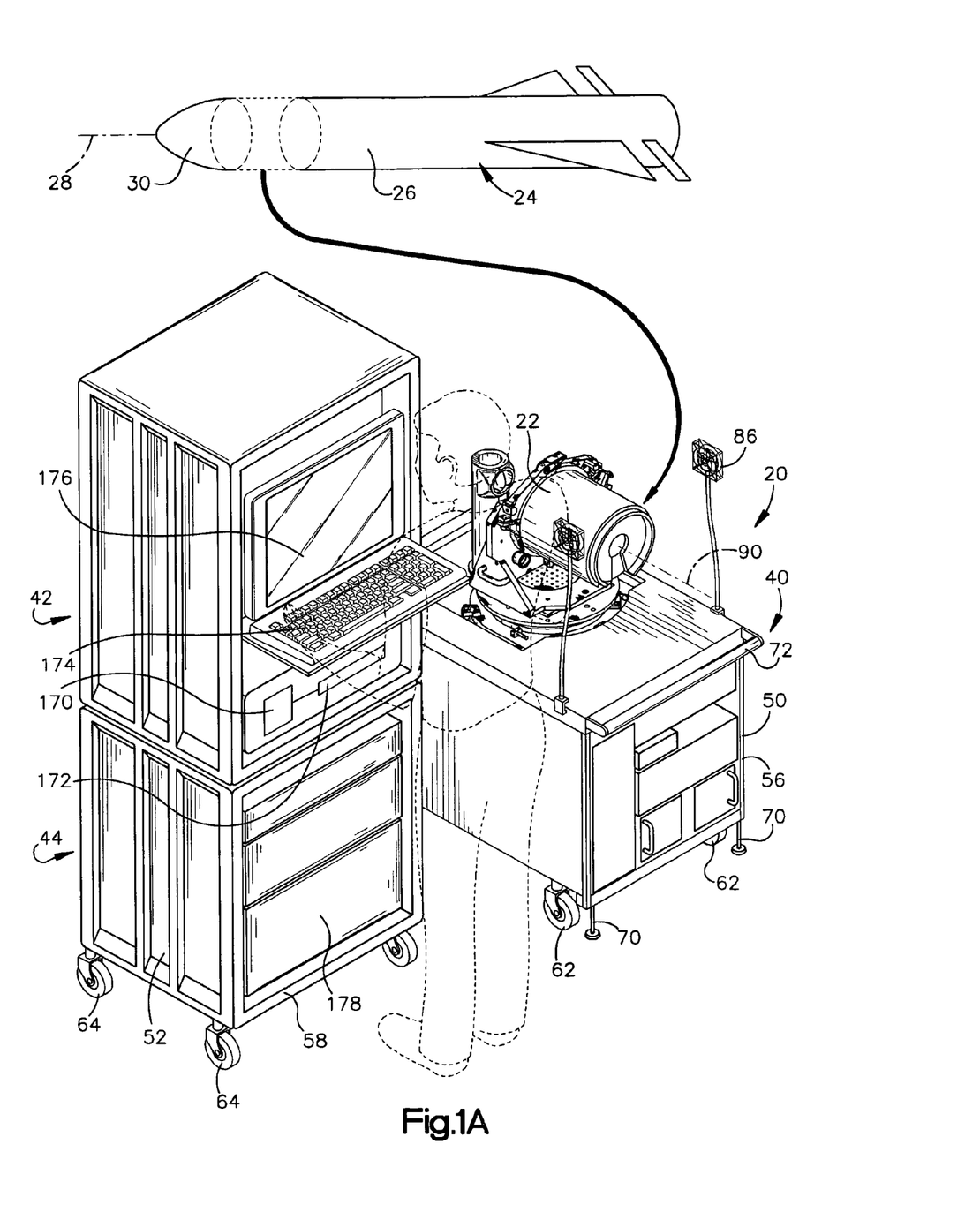
FIGS. 1A and 1B are a schematic view of an exemplary system, partly in exploded view, provided by the present invention for testing an electro-optical guidance assembly of a missile.
Figure 1B:
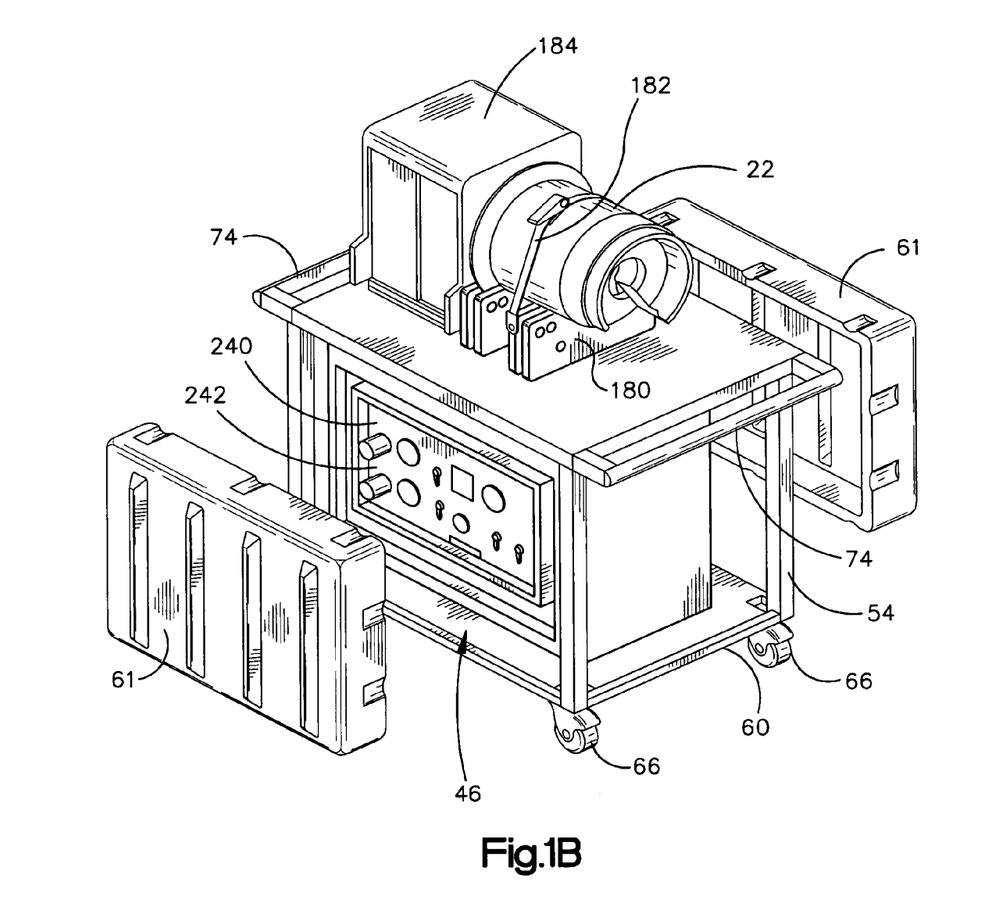

Referring now to the drawings in detail, and initially to FIGS. 1A and 1B, the present invention provides a portable system 20 for testing an electro-optical instrument or device, particularly a guidance control system, for a missile, for example. An exemplary electro-optical guidance control system is described herein, and is referred to as a guidance assembly 22. The present invention combines the separate test stations previously used for testing different types of electro-optical guidance control systems into a mobile system 20 that is readily transported to wherever it is needed.

The compact and portable nature of this system reduces test and repair time from about three years to approximately one week or less, thereby providing a significant savings in time and expense. This system also provides enhanced security since the system, essentially a mobile test station, can be transported to the missile, rather than transporting missiles from around the world to multiple test stations in one or more locations, as was the previous practice. As one might suspect, it is far easier to move the test system provided by the present invention across international borders than it is to transport missiles or missile guidance assemblies.

An exemplary system 20 provided by the present invention is shown in FIGS. 1A and 1B, with a schematic representation of a generic missile 24. Missiles typically have a generally cylindrical body 26 with a longitudinal axis 28. The guidance assembly 22 occupies a section of the body 26 near a forward end of the missile 24, as schematically illustrated in FIG. 1A. A nosecone portion 30 of the missile 24 defines the leading or forward end of the missile, and typically connects to an end of the guidance assembly 22. The nosecone 30 and the guidance assembly 22 can be removed from the missile as a unit and the nosecone 30 can be left in place, or can be removed from the guidance assembly 22 before testing the guidance assembly 22. The mobile test station 20 provided by the present invention can be used to test most electro-optical components of missile guidance systems, including but not limited to FLIRS (Forward Looking Infrared Radar System) and other electro-optical systems, such as those used in such missiles as Maverick™, Paveway™, Javelin™ and other forward-looking missiles made by Raytheon Co. of Waltham, Mass., U.S.A.

The system 20 shown in FIGS. 1A and 1B includes a multi-spectral electro-optical test unit 40 for testing the operation of one or more electro-optical systems in a guidance assembly 22, and a processor unit 42 for controlling the tests and the guidance assembly as it is being tested. Also included in the exemplary system 20 is a power supply unit 44 and a leak test unit 46, commonly referred to as a purge, leak and fill unit. Electrical cables (not shown) can interconnect the units, transferring communications and power therebetween.

Each unit 40, 42, 44, 46 is contained within a housing for transport and storage, although more than one unit can be included in a common housing. Each housing has a frame that allows the housing to be moved as a single unit without disassembly. Thus, each housing could include slots or openings for handles or forklift tines, for example, to make the housing easier to move. In addition or as an alternative, wheels can be mounted to the frame, in which case the housing takes the form of a cart that can be rolled along the ground.

In the illustrated embodiment, the mobile test station 20 includes three separate carts 50, 52, 54. The electro-optical test unit 40 is mounted in a first cart 50, the processor unit 42 and the power supply unit 44 are mounted in a second cart 52, and the leak test unit 46 is mounted in a third cart 54.

Each cart 50, 52, 54 has a frame 56, 58, 60 that supports and protects the components of the respective units 40, 42, 44, 46 carried therein during transport and storage. Removable side panels can be provided for each cart 50, 52, 54. The side panels function as part of or cooperate with the frame 56, 58, 60 to further enclose and protect the components of each unit 40, 42, 44, 46. In FIG. 1B two removable side panels 61 are shown in an exploded view with respect to the third cart 54 housing the leak test unit 46. The side panels can be provided with collapsible legs to serve as tables or chairs when removed from the carts.

Each of the illustrated carts also includes a set of four wheels 62, 64, 66 mounted to the respective frames to facilitate rolling the carts 50, 52, 54 along the ground. In an exemplary embodiment, two of the wheels of each cart can rotate in the usual manner and also pivot about a substantially vertical axis to facilitate maneuvering the cart. The other two wheels are only free to roll or to rotate about a generally horizontal axis, in the usual manner. The wheels 62, 64, 66 can include locking mechanisms to inhibit or prevent unintentional movement of the carts 50, 52, 54, including locking the pivoting wheels so that those wheels can roll without pivoting or so that those wheels can be locked to neither roll nor pivot.

In addition to the wheels 62, 64, 66, the carts 50, 52, 54 can also include two or more stabilizers or levelers 64 for supporting at least part of each cart 50, 52, 54 at a slightly elevated position to prevent unintended rolling movement. The levelers 64 also facilitate leveling the cart on uneven ground, for example, when necessary. In the illustrated embodiment, the first cart 50 includes four levelers 70, one at each corner of the cart 50. The carts also can include handles, such as the handles 72, 74 shown on the first and third carts, 50 and 54, respectively, to facilitate maneuvering the carts along the ground.

While the carts 50, 52, 54 provide some protection for the various units, the carts can be further encased in one or more protective shipping containers (not shown), as will be further discussed below with respect to FIG. 13. Although one configuration of units and respective housings, in this case carts, is shown in the drawings, other configurations and combinations may be preferable to accommodate the needs of any particular situation.

Figure 2:
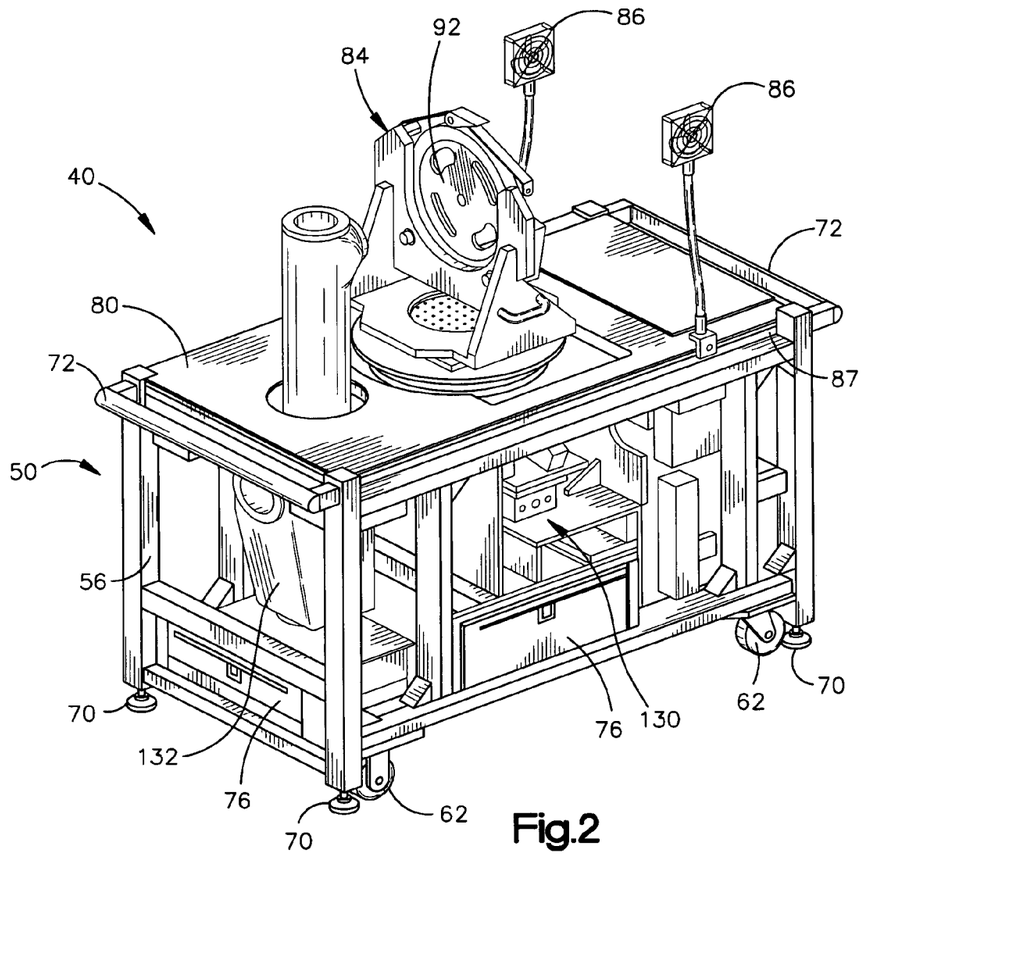
FIG. 2 is a perspective view of a portable cart with an electro-optical test unit of the system shown in FIGS. 1A and 1B.
Figure 3:
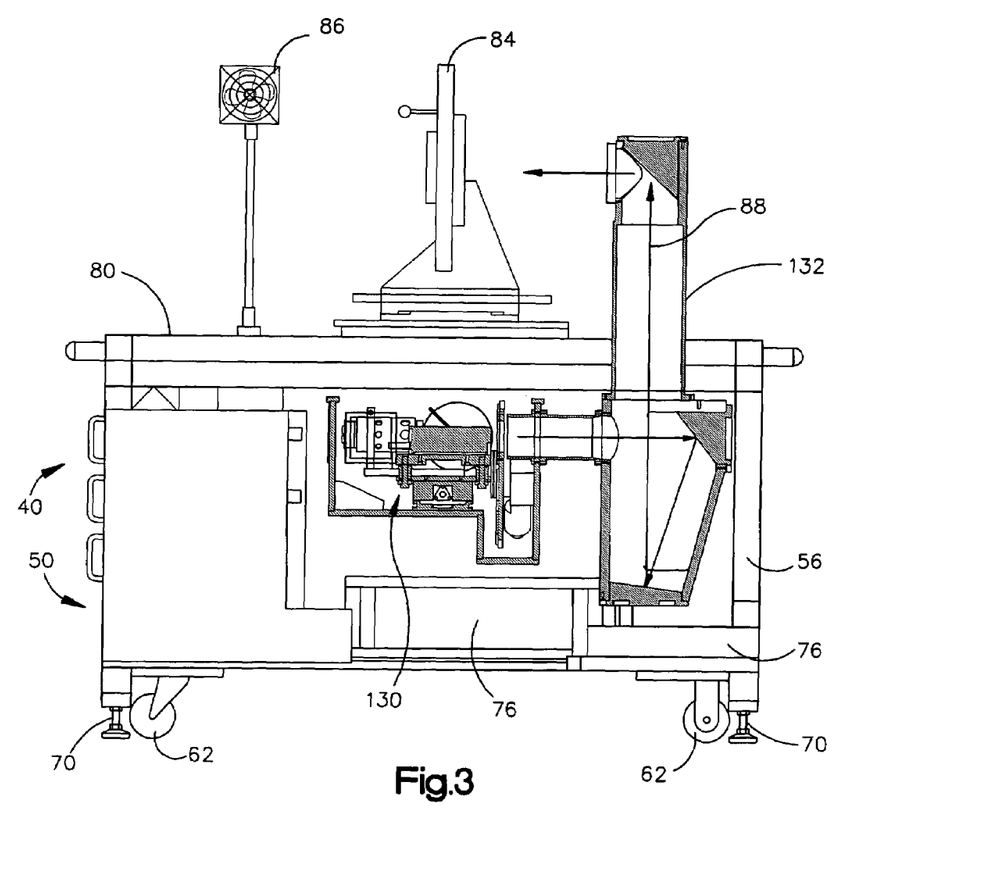
FIG. 3 is a cross-sectional side view of an optical assembly that is part of the electro-optical test unit of FIG. 2.

The first cart 50, which contains the electro-optical test unit 40, is shown in greater detail in FIGS. 2 and 3. The electro-optical test unit 40 provides a multispectral test station for testing electro-optical systems, such as those in a guidance assembly, at different wavelengths from a single test unit. As noted above, the electro-optical test unit 40 includes two or more sources of multispectral electromagnetic energy and electro-optical elements for directing electromagnetic energy of a selected wavelength from any one or more of the sources to a guidance assembly 22 (FIG. 1A) that is being tested. The electro-optical test unit 40 also may provide methods to project the electromagnetic energy in a particular cross-sectional shape, as will be described in the following paragraphs.

In the illustrated figures, the side panels of the cart 50 have been removed to show the generally rectangular frame 56 and the electro-optical test unit 40 mounted to the frame 56. The cart 50 also provides storage space in one or more drawers 76 therein for storing tools and alignment devices, for example. A panel on an upper side of the cart 50 provides a work surface 80, and also provides a mounting location for an adjustable fixture 84 that supports a guidance assembly 22 (FIG. 1A) for testing. The illustrated electro-optical test bench or cart 50 also includes a pair of fans 86 adjustably mounted on rails 87 on opposing sides of the cart 50 to encourage air flow around a guidance assembly held in the fixture 84 to help cool the guidance assembly while it is being tested.

Figure 4:
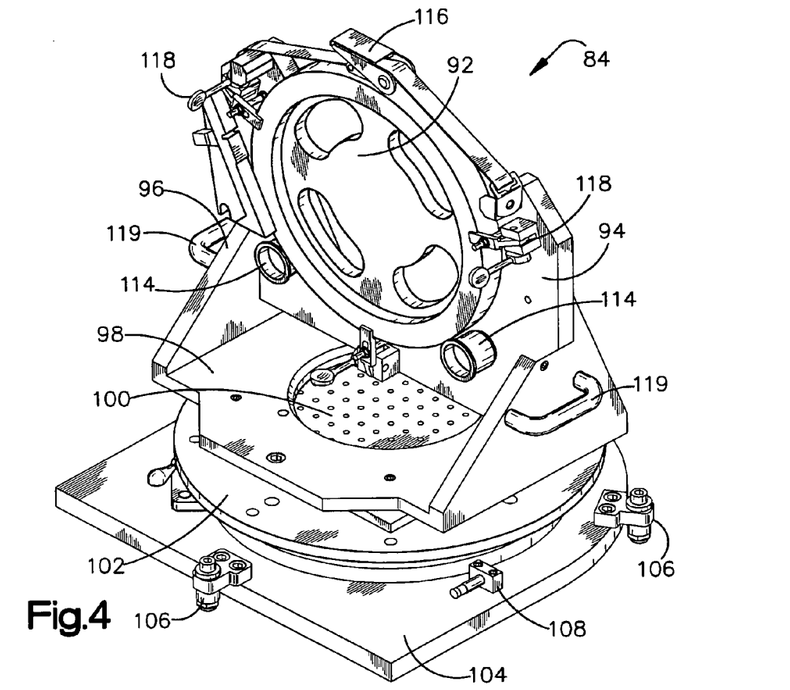
FIG. 4 is an enlarged perspective view of a fixture for supporting a guidance assembly for testing in the electro-optical test unit shown in FIG. 2.

Referring now to FIG. 4 in addition to FIGS. 2 and 3, the fixture 84 is adjustable to align a guidance assembly 22 (FIG. 1A) with a path 88 of electromagnetic energy so that the electro-optical system components being tested will be illuminated by the energy traveling along that path. A guidance assembly has a longitudinal axis 90 (FIG. 1A) that typically is coextensive with the longitudinal axis 28 (FIG. 1A) of a missile 24 (FIG. 1A) when assembled in the missile, and the exemplary fixture 84 shown in the illustrated embodiment is configured to support a guidance assembly with its longitudinal axis 90 (FIG. 1A) substantially horizontal and generally parallel to the path 88 of electromagnetic energy. The fixture 84 is shown in FIGS. 2–4 supporting an alignment plate 92 in place of a guidance assembly 22 (compare with FIG. 1A).

The fixture 84 has a guidance assembly support portion 94 that somewhat resembles a bookend, with an upright portion in the form of a bracket 96 with a circular opening 97 for receiving and rotatably supporting a guidance assembly 22 (FIG. 1A) or an alignment plate 92 therein. The guidance assembly support 94 also includes a generally horizontal base 98, which in turn is mounted on a translation table or stage 100, which is itself in turn mounted on a turntable 102. The turntable 102 is mounted on a base portion 104 of the fixture 84.

The base 104, on which the turntable 102 is mounted, has one or more leveling arms 106 to adjust the tip/tilt orientation of the base 104 relative to the work surface 80, for alignment or leveling purposes. The illustrated embodiment employs a three-point mounting arrangement using three leveling arms 106 relatively equally spaced about the circumference of the turntable 102. The turntable 102 is rotatable about a generally vertical axis to provide angular adjustment and can be held in a desired position by one or more cushioned stops 108 mounted on the base 104.

Mounted on the turntable 102 is the translation stage 100 that provides for adjustment of the position of the guidance assembly support 94 in a direction within a plane that is substantially perpendicular to the turntable's axis of rotation, typically a horizontal plane. The guidance assembly support 94 then is mounted on the translation stage 100.

In the illustrated embodiment, the alignment plate 92 is shown mounted in the opening 97 in the upright bracket portion 96 of the guidance assembly support 94. The alignment plate or a guidance assembly is rotatably positioned on guide rollers 114 mounted to the upright bracket 96. The fixture 84 thus provides for rotation of a guidance assembly about perpendicular axes, its own longitudinal axis 90 (FIG. 1A) and the axis of the turntable 102. The alignment plate 92 or a guidance assembly is held in the upright bracket 96 by a retaining clamp 116, which can include a nylon strap, for example. One or more locking levers 118 hold the guidance assembly in a desired angular position for a desired test. The guidance assembly support 94 also includes a pair of handles 119 for positioning the support 94 on the translation stage 100 and the turntable 102. A generally cylindrical guidance assembly 22 (FIG. 1A) is substituted for the illustrated alignment plate 94 for testing once the alignment plate 94 has been used to align the fixture 84 with the path 88 of the electromagnetic energy, as described below.

The electro-optical test unit 40 also includes an optical assembly 130 with at least two sources of electromagnetic energy at different wavelengths. With the fixture 84 mounted on the work surface 80, electromagnetic energy of a selected type can be delivered along the path 88 from a source in the optical assembly 130 within the cart 50 through a collimator 132 that extends above the work surface 80 to illuminate a guidance assembly 22 (FIG. 1A) in the fixture 84 with the collimated energy.

Figure 5:
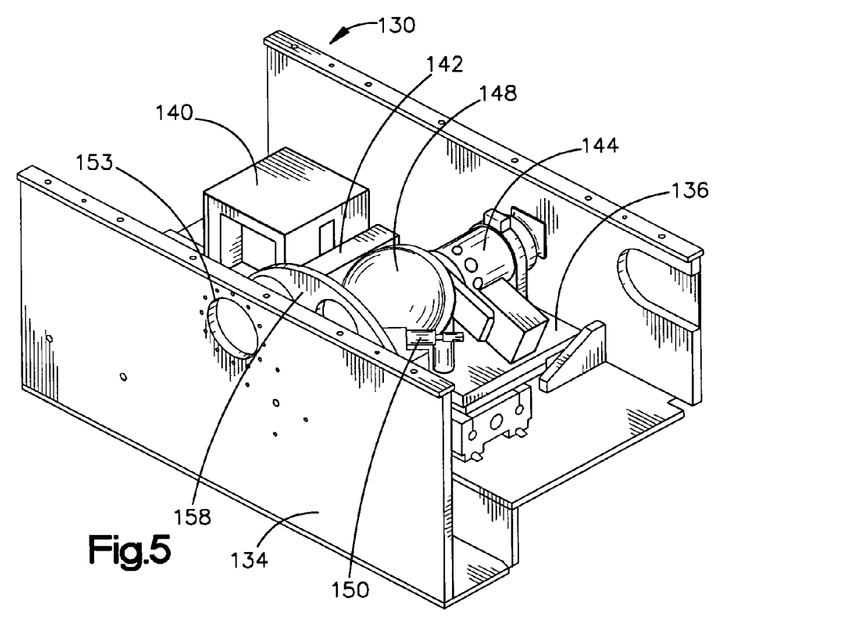
FIG. 5 is a perspective view of the optical assembly of the electro-optical test unit of FIG. 2.
Figure 6:
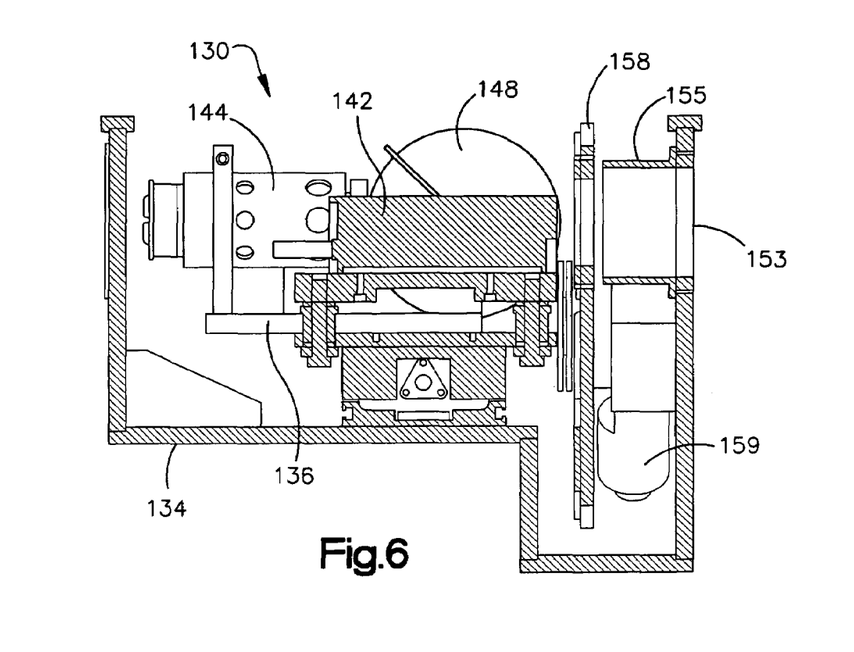
FIG. 6 is a cross-sectional view of the optical assembly of FIG. 5.

Turning now to FIGS. 3, 5 and 6, the optical assembly 130 has a support frame 134 that allows it to be removed from the electro-optical test unit 40 as a unit for maintenance or repair. Mounted on the support frame 134 is a translation stage 136 upon which the sources of electromagnetic energy are mounted. The sources are attached to an optical breadboard that "floats" on anti-vibration mounts, such as vibration pads, and this breadboard forms the deck of the translation stage 136. The sources of electromagnetic energy include a source of black body radiation 140, a laser 142, a visible light source 144, and an infrared light source 146. The translating stage 136 positions the desired source to direct the electromagnetic energy therefrom to the collimator 132 and thus to a guidance assembly in the fixture 84.

The optical assembly 130 also includes an integrating sphere 148 that when coupled with a visible light source, for example, provides a highly uniform beam of visible light. The integrating sphere 148 includes a feedback detector (not shown) that can monitor the light output from the sphere and provide feedback or calibration data for adjusting the source. The entire optical train supplies self-alignment to thirty arcsecs from a source to a guidance assembly in the fixture. The source also can be moved or an optical component in the path can be moved or otherwise altered, to provide a simulated moving target for testing a guidance assembly's tracking capabilities.

The optical assembly 130 also includes an attenuator or iris 150, and a target image selector unit, in the form of a wheel 152 in the illustrated embodiment, that is aligned with an opening 153 in a side of the support frame 134. The iris 150 can be opened or closed to increase or decrease the amount of electromagnetic radiation passing from a source to the target selector wheel 152 and through the opening. A retro-reflective tube 155 mounted to the support frame 134 at the opening 153 is aligned with an opening into the collimator 132.

In conjunction with the laser source 142, the optical assembly 130 also includes a decollimating lens (not shown). The laser 142 and decollimating lens cooperate with one or more alignment devices, described below, that facilitate positioning the fixture 84, and thus a guidance assembly, for testing. Briefly, exemplary alignment devices include at least two spaced apart elements, the first element with a small aperture, such as a pinhole aperture provided as one target 158 (FIG. 7) of a plurality of targets 157 (FIG. 7) in the target selector wheel 152, further described below. A second element, the alignment plate 92, has a reflective surface that is registerable with the fixture 84 such that the fixture 84 can be adjusted to reflect the laser light traveling along the path 88 from the source through the pinhole aperture back along its path to the aperture, thereby aligning the fixture 84 with the laser 142 or other source of electromagnetic energy positioned adjacent the opening 153 of the optical assembly 130.

Figure 7:
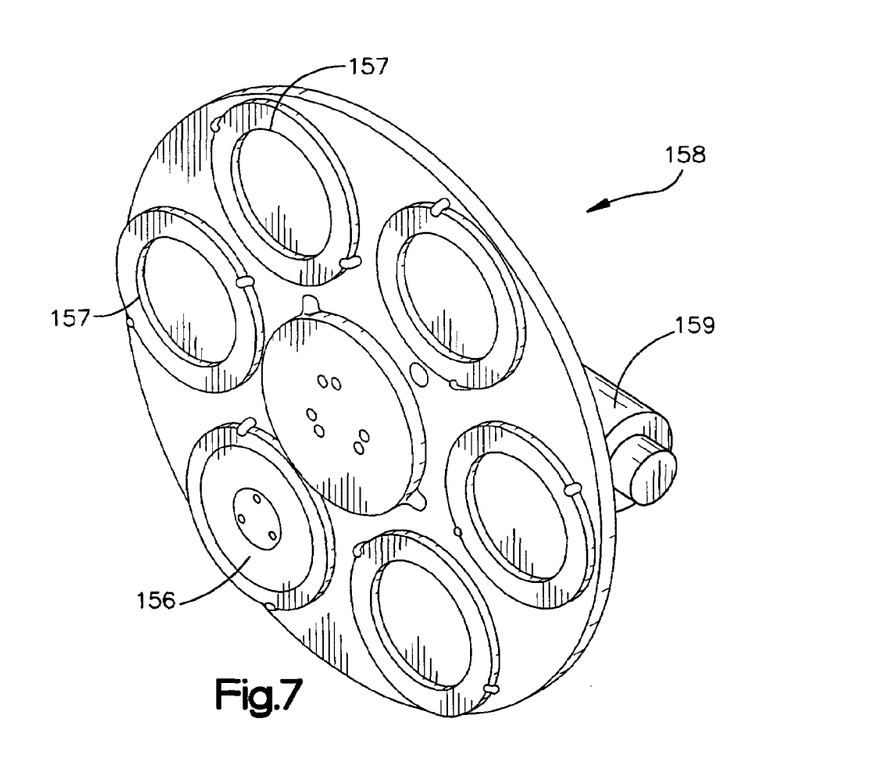
FIG. 7 is a perspective view of a target image selector wheel, which is part of the optical assembly of FIG. 5.

The target selector wheel 152 in the illustrated embodiment, referring now to FIGS. 5–7, is between the operative position for a selected one of the sources 140, 142, 144, 146 (FIG. 4) of electromagnetic energy and the collimator 132 (FIG. 4), and thus a guidance assembly in the fixture 84 (FIG. 4). The target selector wheel 152 includes a plurality of differently shaped apertures or targets 157 that define a shape of the energy pattern or target image for presentation to a guidance assembly. Any of the sources 140, 142, 144, 146 can be selected to illuminate any of the plurality of targets, in this case six targets 157, on the target wheel 152. The target selector wheel 152 and a source function in a manner similar to a slide in a slide projector to define a shape of a target image that illuminates a guidance assembly during a test. In the illustrated embodiment, an electric motor 159 rotates the target wheel 152 about an axis that is substantially parallel to the path 88 (FIG. 4) from a selected source to the collimator 132 (FIG. 4).

Figure 8:
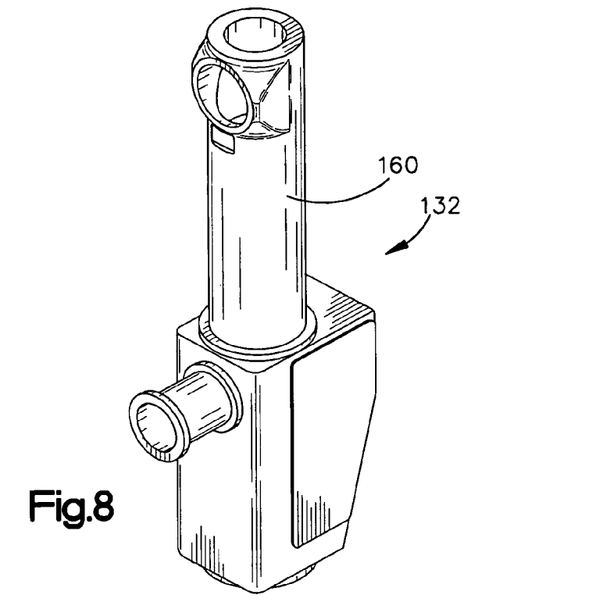
FIG. 8 is a perspective view of a collimator of the electro-optical test unit of FIG. 2.
Figure 9:
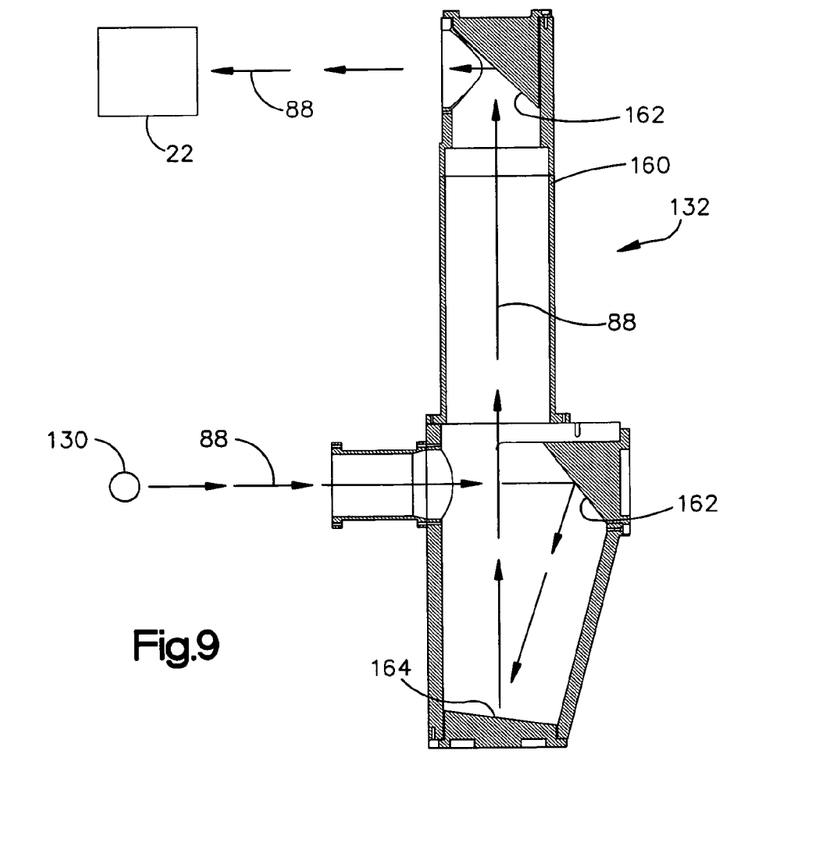
FIG. 9 is a cross-sectional side view of the collimator shown in FIG. 4 schematically illustrating its operation.

The compact collimator 132 acts as a periscope, as shown in FIGS. 4, 8 and 9, directing the selected energy pattern output from the optical assembly 130, within the cart 50 and below the work surface 80, along the path 88 to a guidance assembly or alignment plate 92 (FIG. 3) mounted in the fixture 84 above the work surface 80. The collimator 132 thus has a portion that lies below the work surface 80 and is aligned with the opening 153 from the optical assembly 130 and has a portion that extends above the work surface 80.

The collimator 132 minimizes or eliminates any dispersion of the electromagnetic energy from the selected source. The collimator 132 has a housing 160 that protects a series of fold mirrors 162 and an off-axis parabolic mirror 164, which collimates the incident electromagnetic energy. Together the two types of mirrors 162 and 164 define the path 88 from the optical assembly 130 to the fixture 84. The collimator 132 is very compact and the housing 164 is sealed to minimize the intrusion of dust and moisture, which could affect the function of the mirrors 162 and 164. In summary, the collimator 132 guides the electromagnetic energy received from the source toward the fixture to illuminate a guidance assembly 22 (FIG. 1A) mounted in the fixture 84.

Figure 10:
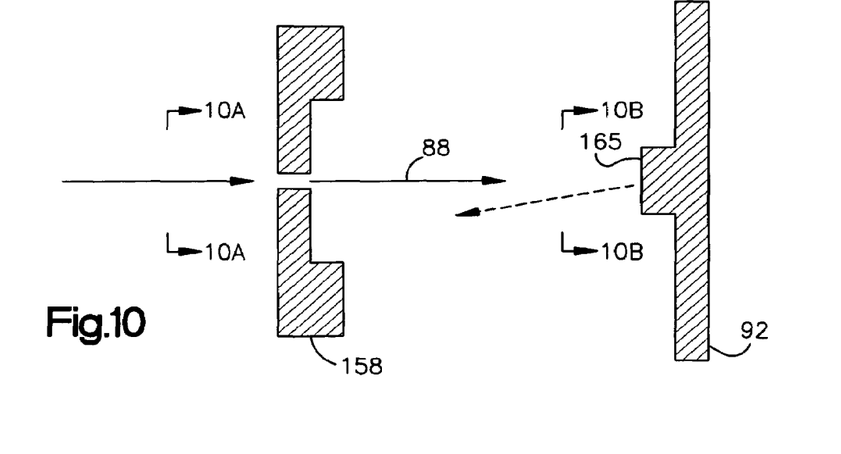
FIG. 10 is a schematic cross-sectional side view illustrating the operation of alignment components for aligning the fixture of the electro-optical test unit of FIG. 2, and FIGS. 10A and 10B are front views of portions of the alignment components of FIG. 10.
Figure 10A:
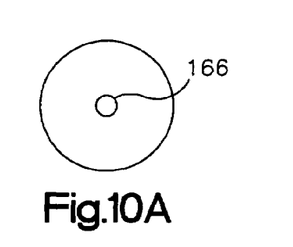
Figure 10B:
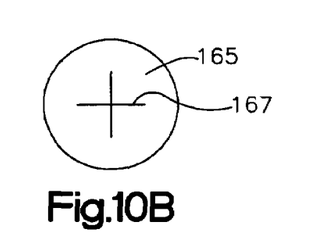

Thus, in order to be illuminated for testing, the guidance assembly must be accurately aligned with the path 88 to receive the collimated electromagnetic energy. Referring now to FIGS. 10–10B, in practice the alignment plate 92 referred to above is mounted in the fixture 84 (FIG. 2) to align the fixture 84, and then the guidance assembly 22 is substituted for the alignment plate 92. With the alignment plate mounted in the fixture, the laser 142 (FIG. 5) is selected as the source of electromagnetic energy and moved into position with the opening 153 in the support frame 134 of the optical assembly 130 (FIG. 5). The pinhole aperture target 158 (FIG. 7) also is selected and the target wheel 152 moves to align the pinhole target with the opening 153 in the support frame 134 (see FIG. 6).

As noted above, the alignment plate 92 has a reflective surface 165 that is registerable with the fixture 84 such that the fixture can be adjusted to reflect the laser light from the pinhole 166 in the aperture target 158 back along the same path, thereby aligning the fixture with the laser, and thereby aligning a guidance assembly with any other source of electromagnetic energy that can be positioned to direct that energy along the path 88.

The centrally located reflective surface 165 preferably is placed in the path of the laser light. If the fixture 84 is properly aligned, the light will reflect back along the path 88, back to the pinhole aperture 166. If the fixture 84 is not properly oriented, the laser beam will not retrace its path, as shown schematically in FIG. 10. The mirror face 165 on the alignment plate has a cross-hair 167 or other marking etched into its surface to facilitate adjusting the fixture. The leveling arms 106 (FIG. 4) adjust the tip/tilt of the fixture to adjust the angles between the plane that includes the face 165 of the alignment plate 92 and the path 88 of the laser beam, and the translation stage 100 (FIG. 4) is used to adjust the position of the fixture relative to the path 88 of the laser beam.

Figure 11:
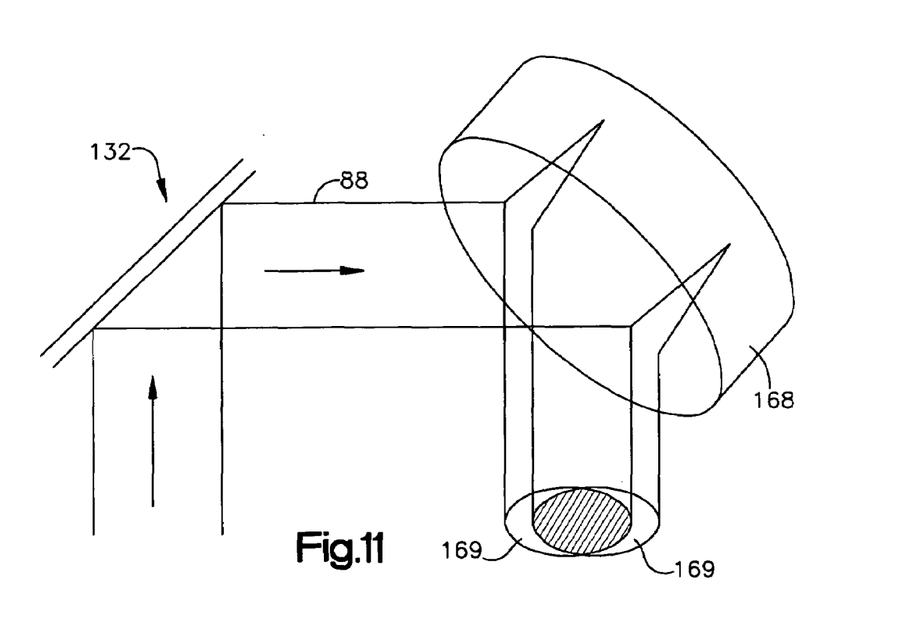
FIG. 11 is a schematic illustration of the operation of a shear plate for testing the collimator of FIG. 9.

Another alignment device provided with the electro-optical test unit 40 (FIG. 1A) is a shear plate 168, shown in FIG. 11, which can be used to determine whether adjustments need to be made to the collimator 132 to provide collimated electromagnetic energy to a guidance assembly mounted in the fixture. Energy from the collimator 132, such as visible light, is partially reflected from a front surface of the shear plate 168, and partially reflected from a rear surface of the shear plate. The reflected beams will overlie each other to form a single uniform shape if the light is collimated, and the reflected beams will diverge from each other, as shown in FIG. 11, to form two distinct or overlapping shapes 169 if the light is not truly collimated. The mirrors and lenses along the path 88 of the electro-magnetic energy can then be adjusted until the resulting beams overlie each other and form a single uniform shape. The alignment plate 92 (FIG. 2) and the shear plate 168 both provide for manual alignment, thereby eliminating further complex electronic systems. However, electrical devices can be included in the system to automate the alignment process, including sensors for detecting the reflected energy and motors for adjusting the fixture or other components of the electro-optical test unit.

When the system 20 (FIGS. 1A and 1B) is in operation, an operator can select a source 140, 142, 144, 146 in the electro-optical test unit, control its operation, select an appropriate target 157 on the target wheel 152 and test the response of a guidance assembly 22 (FIG. 1A) from the processor unit 42 (FIG. 1A). Further details of the second cart 52 and the processor unit 42 will be described with respect to FIG. 1A. Recall that the second cart includes both the processor unit 42 and the power supply unit 44. In the illustrated embodiment, these units are arranged in a generally vertical configuration with the processor unit 42 mounted above the power supply unit 44 to facilitate access by an operator standing upright.

The processor unit 42 includes a processor 170 and an electronic data storage device 172. The processor unit 42 also includes one or more input devices, such as a port for receiving electronic data, a modem, a keyboard 174, an electronic pointer, a touch screen and a microphone, and one or more output devices, such as a display 176, a speaker, a modem and a port for transmitting electronic data. Other types of input and output devices also can be used. The processor unit can further include ethernet capability for remote access to or from the processor unit and a remote processor. The processor unit also includes software for running various tests, storing and analyzing the results, collecting failure, repair or metric data, identifying repairs to be made, or providing work instructions for tests or repairs. For example, the software can control a guidance assembly and the optical assembly of the electro-optical test unit during a test.

In conjunction with the display 176, the processor 170 also provides a graphical user interface (GUI) that facilitates a user's interaction with the processor unit 42, which can make it easier to control the testing process and to analyze the results. In addition, an exemplary processor unit 42 provides an oscilloscope, such as a computer-generated oscilloscope with software for emulating a delayed sweep to delay presentation of signals from a guidance assembly under test by time or a line rate scheme. This gives the system 20 the ability and flexibility to test nonstandard forms of video and other electrical phenomena. One or more of the other test units, such as the electro-optical test unit shown in FIG. 2, can include a display and one or more input devices for maintenance or troubleshooting purposes or for testing aspects of a guidance assembly independent of the processor unit 42.

The present invention uses the PXI™ standard for integrating the electronic components, such as the components of the processor unit 42, into a compact and rugged package. PXI™ is a trademark of the National Instruments Corporation of Austin, Tex., U.S., and the PXI™ standard is maintained by the PXI Systems Alliance. "PXI" stands for PCI eXtensions for Instrumentation, a standard that defines a rugged computer platform that builds on the PCI (Peripheral Component Interconnect) standard commonly associated with personal computer components. The PXI™ standard came into existence in approximately 1998, and provides the benefits of low cost, east of use and flexibility form readily available personal computer (PC) technology, using a PCI bus with integrated timing and triggering to communicate between user-selected electronic modules. The PXI™ standard is particularly advantageous for test and measurement, data acquisition and data analysis purposes. In the context of the present invention, the PXI™ standard provides a way to provide powerful, customizable and compact processor unit 42 for collecting and analyzing the data from the other test units. The PXI™ standard can also provide compact control systems that can be integrated with the different test units independently of the processor unit 42. The "independent" controllers are particularly useful for stand-alone operation of a unit in the absence of a separate processor unit or in limited situations for maintenance or repair functions, for example.

To make the processor unit 42 even more user-friendly, the processor unit can be voice commanded for hands-free operation. The configuration of hardware or software also preferably provides an "Emergency Power Off" for immediately halting power to a guidance assembly 22 being tested and allows the rest of the system 20 to systematically shut down in a controlled and orderly fashion.

When an acceptable power supply is unavailable, power can be supplied to the other units by the power supply unit 44. The power supply unit 44 includes a power controller for converting electrical power from any available source of electricity into an appropriate form of electrical power for operating the other units of the mobile test station 20, as well as operating a guidance assembly 22 under test. The power supply unit also can include a supply of stored power. This "universal" power supply unit facilitates using the test station 20 provided by the present invention in different parts of the world, for example, where different types and qualities of electrical power may be available from an electrical grid or different types of batteries, fuel cells, or other energy storage device. An exemplary power supply unit includes a universal power converter 178, such as a programmable power source available from Elgar Electronics Corporation of San Diego, Calif., U.S., for conditioning the electrical power for supply to the other units.

The last unit of the mobile test station is the purge-leak-fill station, or leak test unit 46, which is shown in its own cart 54 in FIG. 1B. The end panels of the third cart 54 have been removed, and two of the side panels 68 are shown as in an exploded view, spaced from respective sides of the cart 54. A guidance assembly 22 is shown mounted to a fixture 180 on an upper surface of the cart 54. Unlike with the electro-optical test unit 42, the precise angular position of the guidance assembly 22 is not as critical in the leak test unit 46. The pressure test fixture 180 supports the generally cylindrical guidance assembly 22 and allows the guidance assembly to be rotated about its longitudinal axis. The pressure test fixture 180 includes a strap 182 that secures the guidance assembly 22 to the fixture 180 after it has been rotated to the desired position. A shroud 184 is provided to cover the nosecone 30 as a precautionary measure, in case the nosecone 30 should suddenly detach from the guidance assembly 22 during testing.

The guidance assembly is typically a closed system with an inert gas fill, such as nitrogen. In testing for leaks in a guidance assembly, previous systems typically inserted the entire guidance assembly in a vacuum chamber. A tracer gas was injected into the guidance assembly, a vacuum was drawn in the chamber and a gas sensor sensed leakage of the tracer gas from the guidance assembly into the vacuum chamber. These previous test systems were very large, expensive and non-portable.

Figure 12:
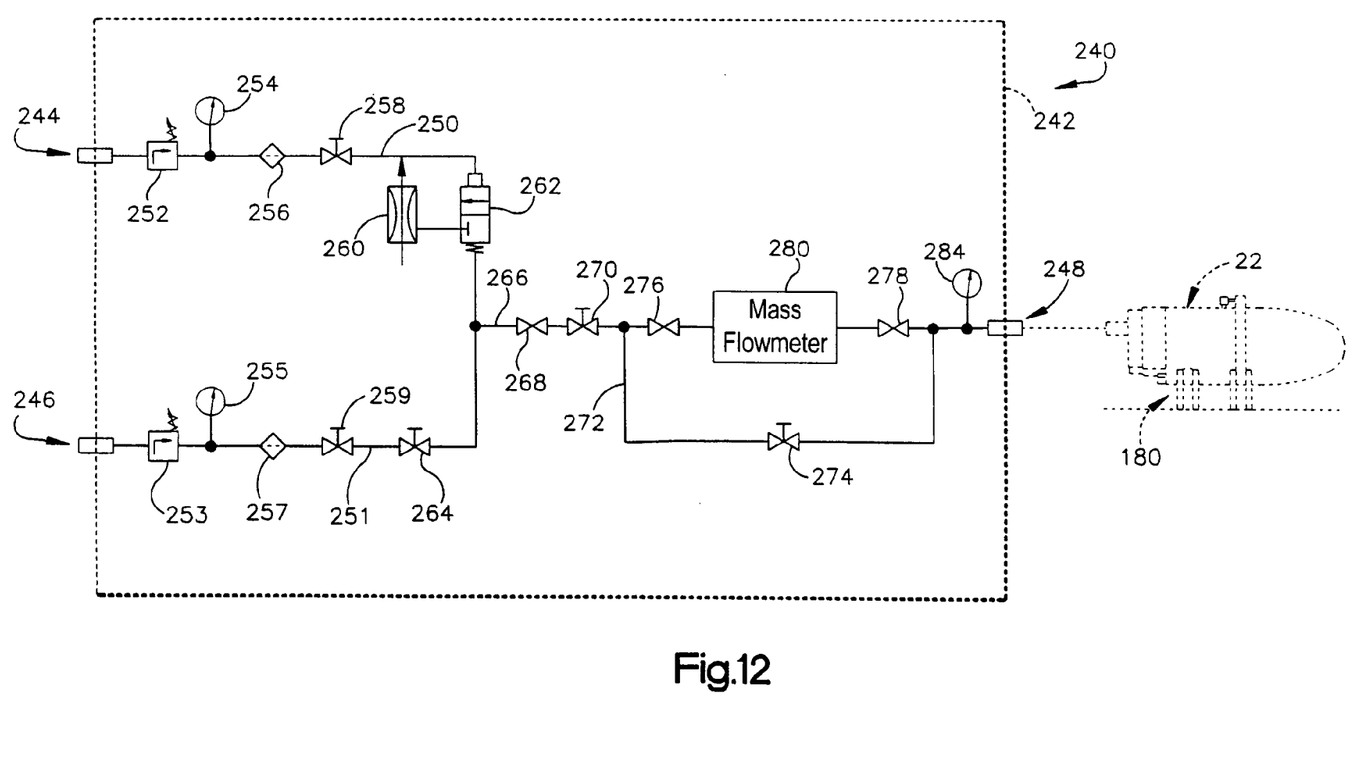
FIG. 12 is a schematic diagram of an embodiment of a leak test unit of the system provided by the present invention.

The leak test unit 46 provided by the present invention is an open-atmosphere, external system that can provide a complete purge, leak test and fill of a guidance assembly 22. The leak test unit includes a leak test control unit 240, an exemplary embodiment of which is schematically illustrated in FIG. 12. The leak test control unit typically has a housing 242 that allows it to be installed in and removed from the third cart 54 (FIG. 1B) in which it is mounted. In addition to any power and communication connections (not shown) for connecting the leak test unit 46 to the power supply unit 44 and processor unit 42 (see FIG. 1A), the leak test control unit 240 has three inlet ports in the housing 242: a first inlet port 244 for a supply of compressed air, a second inlet port 246 for a supply of an inert gas, such as nitrogen, and a test port 248 for connecting the control unit 240 to a guidance control assembly 22 mounted in the pressure test fixture 180. The supply of compressed air connected to the first inlet port 244 can include pressurized air in a bottle or tank, or standard shop air.

Within the housing, a first supply line or shop air line 250 extends from the first inlet port 244, and a second supply line 251 extends from the second inlet port 246. In the exemplary embodiment shown in FIG. 12, each of the first supply line 250 for the compressed air or shop air and the second supply line 251 for the inert gas or nitrogen includes four similar elements adjacent the respective inlet ports 244, 246. These elements include an adjustable regulator 252, 253, a pressure gauge 254, 255, an in-line filter 256, 257 and a valve 258, 259 for opening or closing the respective supply line 250, 251. The first supply line or shop air supply line 250 also includes a vacuum pump 260 that can be engaged to draw a vacuum and purge the lines of the control unit 240 or the guidance assembly. A normally closed valve 262 also is in line with the first supply line 250 and in parallel with the vacuum pump 260, which exhausts to atmosphere. In line with the second supply line or nitrogen supply line 251 is a flowmeter valve 264. Both supply lines 250, 251 join to a common test line 266.

From the junction with the supply lines 244, 246 to the test port 248, the test line 266 includes a pressure relief valve 268, a vent valve 270, a bypass line 272 with a bypass 274 in parallel with a pair of metering valves 276, 278 bounding a mass flowmeter 280. The metering valves restrict the pressure to which the mass flowmeter is exposed to protect the typically sensitive flowmeter from rapid pressure changes. On the other side of the bypass and the flowmeter is a test line pressure gauge 284 and the test port 248. The specific state of each valve during the purge, leak test and fill procedures will be discernable from the following general description, although to simplify the description the state of each valve will not be described for each procedure.

In operation, a line, typically a flexible gas line with a quick connect coupling, is connected between a guidance assembly 22 supported in the leak test fixture 180 and the test port 248, a supply of compressed air is connected to the first inlet port 244, and a supply of inert gas, such as nitrogen, is connected to the second inlet port 246. The valves 258, 259 in the first and second supply lines, respectively, are initially closed.

Before testing for leaks, the lines 250, 251, 266 are purged by opening the vacuum valve 258 to the pressurized air, activating the vacuum 260, and opening and closing the necessary valves to purge each of the lines 250, 251, 266. The vacuum valve 258 is then closed and the vacuum 260 is deactivated.

After deactivating the vacuum 260, the nitrogen supply valve 259 and the flowmeter bypass valve 274 are opened to pressurize the lines, and a guidance assembly 22, with nitrogen. A pressure of about five to over about ten pounds per square inch (about 34.5 kPa to over about 68.9 kPa) is sufficient in the illustrated system. After a sufficient period of time has elapsed to allow the pressure to stabilize, about five minutes or less, the bypass valve 274 is closed and the flowmeter 280 is activated to detect fluid flow therethrough.

The processor unit 42 (FIG. 1A) monitors the flow through the flowmeter 280 to detect leaks. By monitoring the gas flow, the leak test unit 46 can help to determine whether the guidance assembly 22 is intact, or whether any seals, castings, or other parts of the guidance assembly 22 have been compromised. In other words, the leak test unit 46 tests whether the guidance assembly 22 has an unacceptable leak. If the flow rate exceeds a predetermined threshold value, then the processor unit will indicate the presence of an unacceptable leak and the guidance assembly 22 can be purged to facilitate repairs.

At the completion of the test, the guidance assembly 22 is re-pressurized with an inert gas fill, typically nitrogen, to a predetermined pressure. The pressurized gas reduces the dew point within the guidance assembly and provides a positive pressure that keeps dust and other contaminants from infiltrating the guidance assembly, thereby minimizing the risk of damage to the electronic and optical components of the guidance assembly 22 from moisture and dust particles.

The illustrated embodiment also facilitates purging the lines in the absence of a guidance assembly, self-testing the leak integrity of the internal lines and valves, and calibrating the flowmeter.

Figure 13:
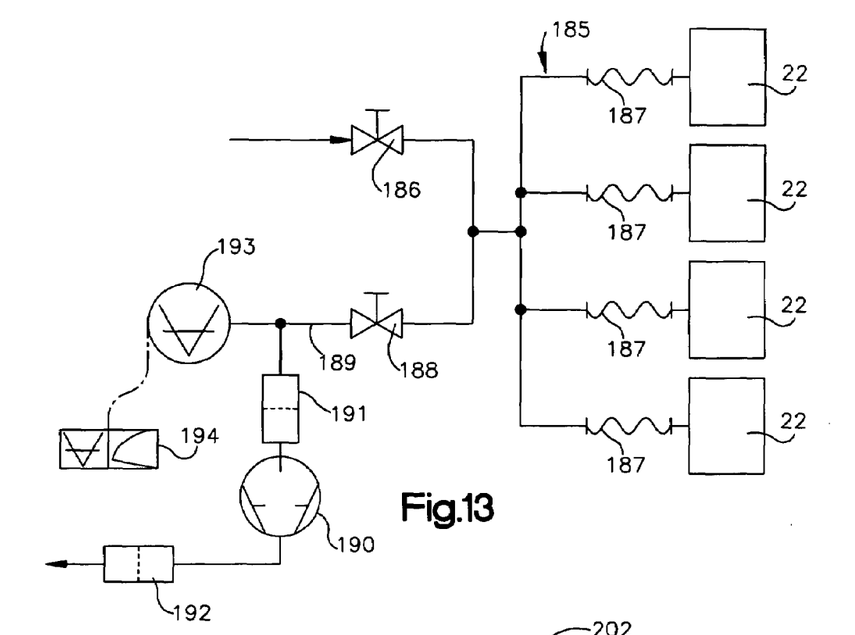
FIG. 13 is a schematic diagram of an alternative embodiment of a leak test unit of the system provided by the present invention.

An alternative arrangement is schematically illustrated in FIG. 13. In this arrangement, the leak test unit can test multiple guidance control assemblies 22 at the same time using a multiple-port manifold 185. Pressurized gas from a supply (not shown) passes through a first valve 186 and travels through the manifold 185 to the guidance assemblies 22. The individual supply lines 187 between the manifold 185 and the guidance assemblies preferably are flexible and have a quick-connect attachment for connecting each flexible gas line to each of the guidance assemblies. A second valve 188 parallel to the first valve 186 can be opened and closed in conjunction with the closing and opening, respectively, of the first valve 186 to connect an exhaust line 189 to a vacuum pump 190. In the illustrated embodiment, the exhaust line 189 includes a trap 191 upstream of the vacuum pump 190, to trap larger particles, for example, and a filter 192 downstream of the pump to collect smaller particles and other contaminants as the gas is drawn therethrough. A thermocouple 193 and a vacuum gauge 194 are connected to the exhaust line 189 between the second valve 188 and the vacuum pump 190 to monitor the pressure in the exhaust line 189.

In operation, the second valve 188 typically would be opened to purge the inert gas from the guidance assemblies 22 and remove contaminants. When the second valve 188 is closed, the first valve 186 can be opened to pressurize the guidance assemblies. After a period of time estimated to be sufficient for the pressure to stabilize at a preset value, a flow meter in the supply line is actuated to check for leaks by monitoring the gas flow through the supply line. The presence of a flow rate above a predetermined value would indicate an unacceptable leak. One or more of the guidance assemblies connected to the manifold can be selectively isolated for testing purposes.

As noted above, the compact nature of the system 20 as a whole, as seen in FIGS. 1A and 1B, as well as the compact configuration of each of the separate units 40, 42, 44, 46 that make up the system 20, make it easier to transport the system 20 wherever there are guidance assemblies that need to be tested. While the carts 50, 52, 54 provide an exemplary means for moving the system 20 locally, a truck, train car or cargo plane would be more likely modes of transport over longer distances. To further protect the carts 50, 52, 54 from damage during transport, or storage, the present invention also contemplates loading the carts into one or more shipping containers.

Figure 14:
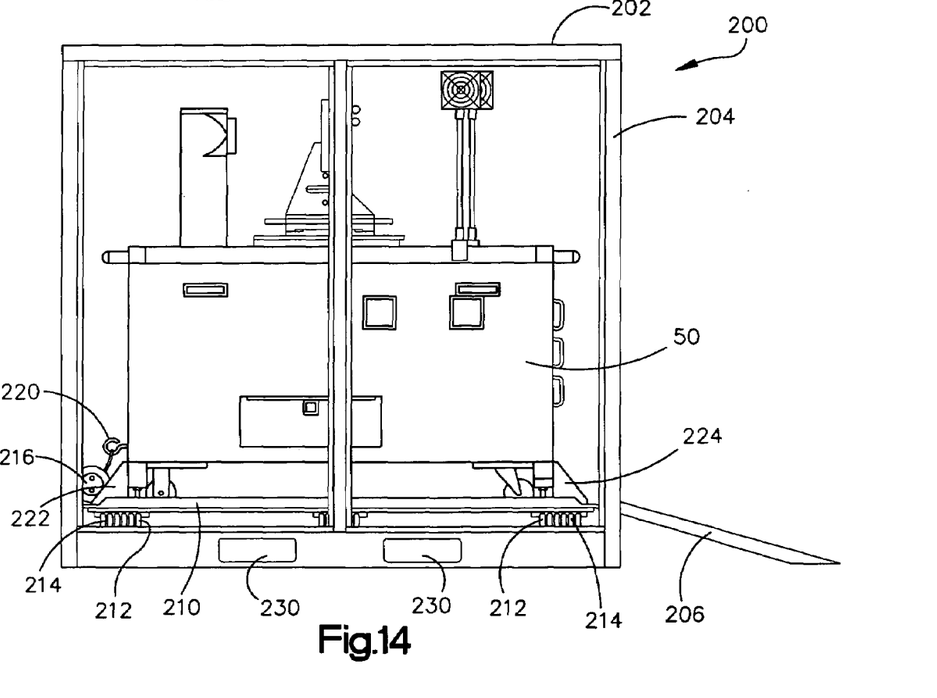
FIG. 14 is a side view of an electro-optical test unit of FIG. 2 shown mounted in a shipping container for transport, the shipping container having a side panel removed to illustrate its interior construction and use.

An exemplary shipping container 200, for further protecting one or more of the carts 50, 52, 54 (FIGS. 1A and 1B), is shown in FIG. 14. In the illustrated embodiment, the first cart 50 is shown loaded into the container 200. The shipping container 200 has a housing 202 that includes a frame 204 that generally defines the envelope within which the cart 50 is contained. The housing 202 includes side panels 206 that cooperate with the frame 204 to protect the cart 50, although a side panel has been removed to show the cart 50 and to illustrate the internal components of the container 200. A front panel 206 of the container is shown in a lowered position where it can function as a ramp for loading or unloading the cart 50.

The shipping container 200 also includes one or more generally horizontal supports or guide rails 210 arranged to support the wheels 64 of the cart 50. Each guide rail 210 is mounted on a plurality of shock mounts 212 that include one or more resilient devices, such as springs 214, to further cushion the cart 50 and its components during transport. The illustrated container 200 also includes an electric hoist or winch 216 to help load the cart 50 into the container 200 and then unload the cart 50. This can be very helpful, since a cart can be much heavier than one person could typically push up the ramp into the cart, particularly from uneven ground, perhaps around 1,000 lbs. (about 450 kg).

To help connect the winch 216 to the cart 50, an eye bolt 220 or similar device is attached to the frame of the cart 50, to which a cable or chain from the winch can be connected to the cart. The winch 216 can pull the cart 50 up the ramp 206, onto the guide rails 210 and into the container 200 until the cart engages one or more back stops 222 at the end of the guide rails 210. The winch 216 then helps to hold the cart 200 in place for transport or storage. Additional stops or other bracing members 224 secured against an opposite side of the cart 50 further hold it in place, and the ramp 206 (now functioning as a door) can then be raised and secured to the previously-open end of the container 200.

The illustrated container 200 also includes a pair of openings or slots 230 for receipt of the tines of a forklift to facilitate loading the container 200 onto a vehicle for transport or otherwise for lifting and moving the container 200.

As shown and described, the portable system provided by the present invention provides significant advantages over the previous way in which missile guidance control systems were tested. To summarize, the system incorporates multiple sources of electromagnetic energy at different wavelengths into a single, portable unit, and provides a processor with components, including software, that facilitate both conducting test procedures and analyzing test results. Since the PXI™ modules and the software are more easily changed, replaced or updated, the system provides substantial flexibility and opportunity for improvement over time.

The system also includes an adjustable fixture for supporting a guidance assembly for testing, and an alignment system for accurately positioning the fixture and thus a guidance assembly mounted thereto.

The system further includes a self-contained power supply unit for supplying power, or conditioning whatever electrical power is available, to operate the other elements of the system, making the system more portable and providing flexibility in where and when the system can operate.

Not to be forgotten, the system also incorporates an open-atmosphere, external purge-leak-fill leak test unit that can test the leak-integrity of the guidance assembly without enclosing it in a vacuum chamber. The leak test unit also can operate on pressurized air from a variety of sources, further enhancing the portability of the system.

Finally, the present invention provides a shipping container with shock mounts to help protect the unit loaded therein and an integral winch for loading and unloading each unit and retaining it in its loaded position in the shipping container.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure that performs the function in the illustrated embodiment of the invention. In addition, while a particular feature of the invention may have been described with respect to only one of several illustrated embodiments, such a feature may be combined with one or more other features of the other embodiments, as maybe desired and advantageous for any given or particular application.

What is claimed is:

1. A portable system for testing an electro-optical guidance assembly, comprising: a frame with an electro-optical test unit mounted to the frame for testing the operation of one or more electro-optical systems in a guidance assembly, wherein the electro-optical test unit includes at least two sources that output electromagnetic energy at different wavelengths for selectively illuminating a guidance assembly with electromagnetic energy from at least one of the sources.

2. A system as set forth in claim 1, wherein the at least two sources include at least two of a source of blackbody radiation, a visible light source, an infrared light source and a laser.

3. A system as set forth in claim 1, wherein the electro-optical test unit includes an adjustable fixture mountable on the frame for supporting a guidance assembly for testing.

4. A system as set forth in claim 3, wherein the fixture is rotatable about perpendicular axes to align the fixture and can be fixed in position for testing a guidance assembly.

5. A system as set forth in claim 3, wherein the fixture has one or more alignment devices that facilitate positioning the fixture, and thus a guidance assembly, for testing.

6. A system as set forth in claim 5, wherein the alignment devices include at least two spaced apart elements, a first element with a small aperture that is aligned with a source of electromagnetic energy, and a second element having a reflective surface that is registerable with the fixture such that the fixture can be adjusted to reflect electromagnetic energy received from the aperture back to the aperture, thereby aligning the fixture with the source of electromagnetic energy.

7. A system as set forth in claim 1, wherein the electro-optical test unit includes means for selectively illuminating the guidance assembly with electromagnetic energy from a selected source.

8. A system as set forth in claim 7, wherein the means for selectively illuminating the guidance assembly includes a collimator that directs and collimates electromagnetic energy from a selected source toward the guidance assembly.

9. A system as set forth in claim 7, wherein the electro-optical test unit includes a target selector wheel that is movable into a position between one of the sources of electromagnetic energy and a guidance assembly under test to define a shape of a target image that is presented to the guidance assembly.

10. A system as set forth in claim 9, wherein the selector wheel includes a plurality of targets that can be selectively moved between the source of electromagnetic energy and a guidance assembly under test.

11. A system as set forth in claim 9, wherein the selector wheel includes a plurality of targets that can be selectively moved between the source of electromagnetic energy and a guidance assembly under test.

12. A system as set forth in claim 1, wherein the electro-optical test unit includes a target selector wheel that is movable into a position between one of the sources of electromagnetic energy and a guidance assembly under test to define a shape of a target image that is presented to the guidance assembly.

13. A system as set forth in claim 1, further comprising a processor unit for controlling the electro-optical test unit, wherein the processor unit includes a processor and one or more of:
 (i) an electronic data storage device,
 (ii) software for operating the test unit, storing and analyzing results, identifying repairs to be made, or providing work instructions to an operator for test or repairs,
 (iii) one or more input devices, including one or more of a port for receiving electronic data, a modem, a keyboard, an electronic pointer, a touch screen, and a microphone, and (iv) one or more output devices, including one or more of a display, a speaker, a modem, and a port for transmitting electronic data.

14. A system as set forth in claim 13, wherein the processor unit operates to select a desired source, select a desired target, and align the selected source and the target on a target wheel so that the selected source illuminates the selected target on the target wheel.

15. A system set forth in claim 14, wherein the target wheel includes a pinhole target for alignment purposes.

16. A system as set forth in claim 14, wherein a source of electromagnetic energy includes a laser and a decollimating lens.

17. A system as set forth in claim 1, further comprising a power supply unit that provides electrical power to the electro-optical test unit.

18. A system as set forth in claim 17, wherein the power supply unit includes a universal power conversion unit for converting electrical power from any available source of electricity into a standard form of electrical power.

19. A system as set forth in claim 1, further comprising a cart in which the electro-optical test unit is mounted to facilitate transportation and storage.

20. A system as set forth in claim 19, further comprising a container adapted to receive one or more carts to further protect the cart during transportation and storage.

21. A system as set forth in claim 20, wherein the container includes at least one support for supporting the cart and at least one cushioning device interposed between the support and the container to cushion the cart during transportation.

22. A system as set forth in claim 20, wherein the container includes at least one bracket for securing the cart onto the at least one support inside the container.

23. A system as set forth in claim 20, wherein one wall of the container serves as a ramp for loading and unloading the cart with respect to the container.

24. A system as set forth in claim 20, wherein the container includes a winch mounted in the container to facilitate loading and unloading the cart.

25. A system as set forth in claim 20, wherein the container includes one or more openings to receive the times of a forklift truck to facilitate moving the container.

26. A system as set forth in claim 1, further comprising a leak test unit that can pressurize the guidance assembly with an inert gas to test for leaks.

27. A system as set forth in claim 26, wherein the leak test unit includes a sensor for detecting leaks in the guidance assembly.

28. A system as set forth in claim 27, wherein the sensor is a mass flowmeter that detects gas flow therethrough to detect leaks in the guidance assembly.

* * * * *